(12) United States Patent
Uchikawa

(10) Patent No.: US 7,123,294 B1
(45) Date of Patent: Oct. 17, 2006

(54) IMAGE FILE APPARATUS AND METHOD FOR STORING DISPLAY IMAGE DATA CORRESPONDING TO A DISPLAY SIZE

(75) Inventor: Michiaki Uchikawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/496,405

(22) Filed: Feb. 2, 2000

(30) Foreign Application Priority Data

Feb. 2, 1999 (JP) .................................. 11-025522

(51) Int. Cl.
*H04N 5/76* (2006.01)
*H04N 5/222* (2006.01)

(52) U.S. Cl. .................. 348/231.2; 348/333.01

(58) Field of Classification Search .......... 348/231.99, 348/231.2, 231.3, 231.7, 333.01, 333.11, 348/333.12, 333.05, 231.08
See application file for complete search history.

(56) References Cited

U.S. PATENT DOCUMENTS

| 5,067,029 | A | * | 11/1991 | Takahashi | .................. | 386/38 |
| 5,153,730 | A | * | 10/1992 | Nagasaki et al. | ........ | 348/231.6 |
| 5,164,831 | A | * | 11/1992 | Kuchta et al. | ........... | 348/231.7 |
| 5,724,579 | A | * | 3/1998 | Suzuki | ..................... | 707/104.1 |
| 6,016,184 | A | * | 1/2000 | Haneda | ........................ | 355/36 |
| 6,137,534 | A | * | 10/2000 | Anderson | ................. | 348/222.1 |
| 6,313,877 | B1 | * | 11/2001 | Anderson | ............. | 348/333.05 |
| 6,335,760 | B1 | * | 1/2002 | Sato | .......................... | 348/397.1 |
| 6,542,192 | B1 | | 4/2003 | Akiyama et al. | | |
| 6,618,082 | B1 | * | 9/2003 | Hayashi et al. | ........ | 348/231.99 |

FOREIGN PATENT DOCUMENTS

| JP | 1-172996 A | 7/1989 |
| JP | 5-249948 A | 9/1993 |
| JP | 10-233995 A | 9/1998 |

* cited by examiner

*Primary Examiner*—Tuan Ho
*Assistant Examiner*—Timothy J. Henn
(74) *Attorney, Agent, or Firm*—Birch, Stewart, Kolasch & Birch, LLP

(57) ABSTRACT

In an apparatus and method according to the present invention, image data is read and stored in a recording medium. If the size of the original image data is determined as being different from the display size of a monitor apparatus, the original image data is converted to change the size of the original image to the display size of the monitor apparatus. The converted image data (display image data) is also stored in the recording medium. Therefore, image data whose size corresponds to the display size can be read from the recording medium when displaying the image, thus reducing the time required to display the image on a monitor apparatus.

20 Claims, 3 Drawing Sheets

F I G. 3
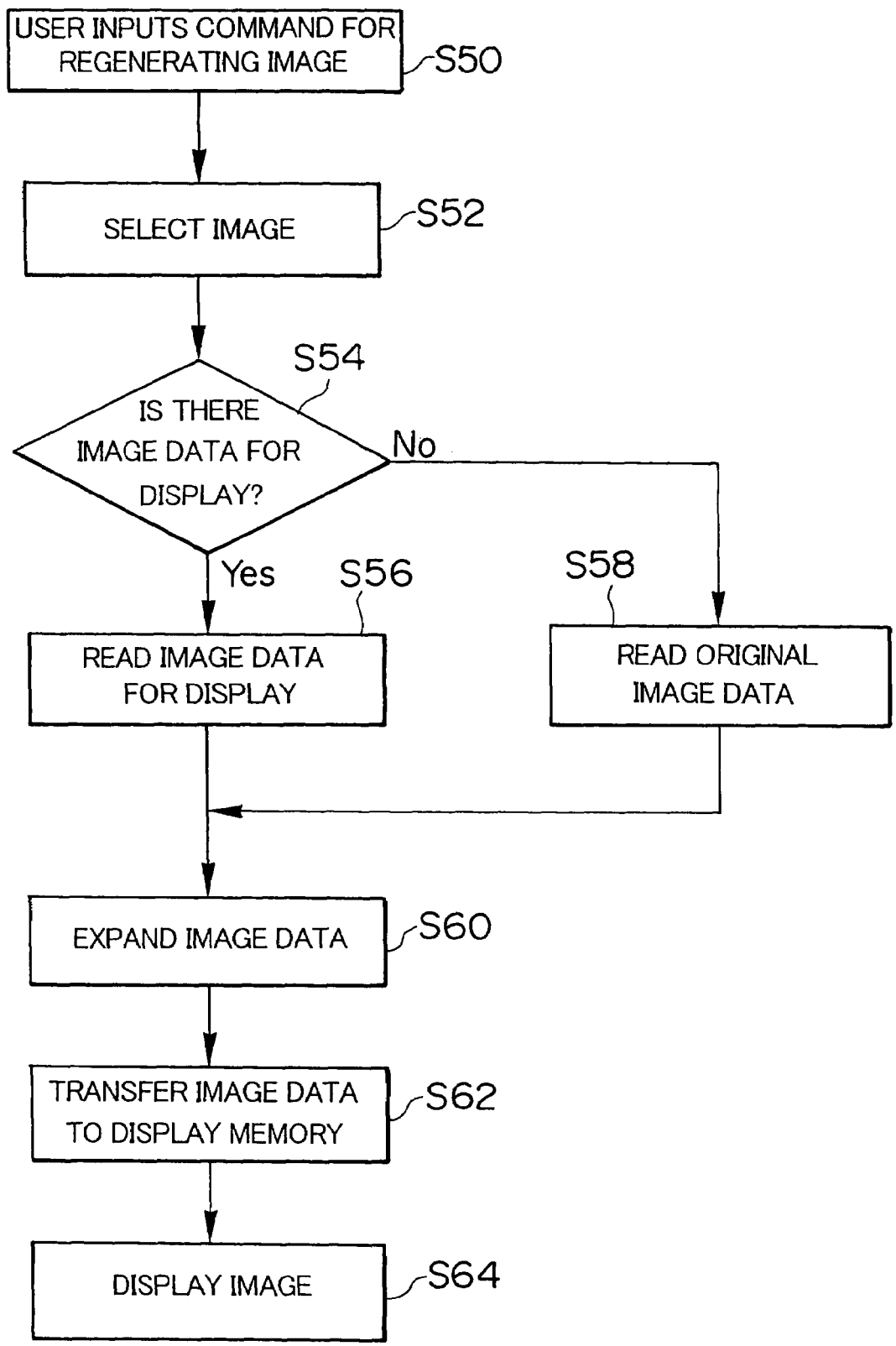

IMAGE FILE APPARATUS AND METHOD FOR STORING DISPLAY IMAGE DATA CORRESPONDING TO A DISPLAY SIZE

BACKGROUND OF THE INVENTION

1. Field of the Invention

This invention relates generally to an image file apparatus. More particularly, this invention relates to an image file apparatus that records and stores an image, which is recorded in a recording medium by a digital camera or the like, in another recording medium.

2. Description of Related Art

In general, a recording medium such as a memory card for use in a digital camera is relatively expensive, and it is not economical to have a number of memory cards. To address this problem, image data recorded in the recording medium by the digital camera is stored in another recording medium having a large recording capacity (such a medium is relatively inexpensive per bit) for use in an image file apparatus.

On the other hand, the number of pixels in an imaging device in the digital camera has been increasing recently, so that image data with a large number of pixels (high resolution) can be recorded in the recording medium. In order to read the image data with a large number of pixels from the recording medium and display the entire image on a monitor such as a CRT display in accordance with the read image data, the image data is reduced and interpolated to decrease the number of the pixels therein in accordance with a display size of the monitor.

If image data with a large number of pixels is read from the recording medium and is reduced and interpolated to decrease the number of the pixels therein according to the display size of the monitor every time an image is displayed on the monitor, a long time is taken due to the large amount of data accessed. Moreover, some amount of time is needed to reduce the data and the like, further adding to the amount of time required to display the image on the monitor.

SUMMARY OF THE INVENTION

It is therefore an object of the present invention to provide an image file apparatus, which is capable of displaying an image in accordance with image data recorded in a recording medium within a short time.

The above object can be accomplished by providing an image file apparatus comprising: a first image data reading device that reads original image data; a converting device that converts the original image data read by the first image data reading device into display image data whose amount corresponds to a display size of a display; and an image recording device that records the original image data read by the first image data reading device into a first recording medium, and that records the display image data produced by the converting device into the first recording medium, when a size corresponding to the original image data is different from the display size of the display.

More specifically, the image file apparatus stores the original image data, and if the size corresponding to the original image data is different from the image data size for displaying on the display, the image file apparatus converts the original image data into the display image data using the converting device and stores the display image data at the same time as the recording of the original image data.

The original image data may be read from a second recording medium, which is built into or is detachably mounted in a digital camera. The first recording medium may be built into the image file apparatus, attached to the outside of the image file apparatus, or detachably mounted in the image file apparatus.

In one preferred form of the present invention, the image file apparatus further comprises: a second image data reading device that reads the display image data from the first recording medium when the display image data has been recorded in the first recording medium, and that reads the original image data from the first recording medium when the display image data has not been recorded in the first recording medium; and a display driver that drives the display to display an image in accordance with one of the original image data and the display image data, the one of the original image data and the display image data being read by the second image data reading device.

More specifically, the original image data is stored in the first recording medium, and if the size of the original image data is different from the display size of the display, the display image data corresponding to the original image data is stored along with the original image data. Therefore, the second image reading device can read the display image data or the original image data in the same display size as the display image from the first recording medium. Thus, the display image data with a smaller amount of data is accessed instead of the original image data with a larger amount of data, and this reduces the access time. Moreover, there is no necessity of reducing or interpolating the image, and thus, the image can be displayed quickly on the display.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a flow chart that assists in explaining how an image is regenerated in the image file apparatus in FIG. 1.

DETAILED DESCRIPTION OF THE PREFERRED EMBODIMENT

This invention will be described in further detail by way of example with reference to the accompanying drawings.

Figure 1:
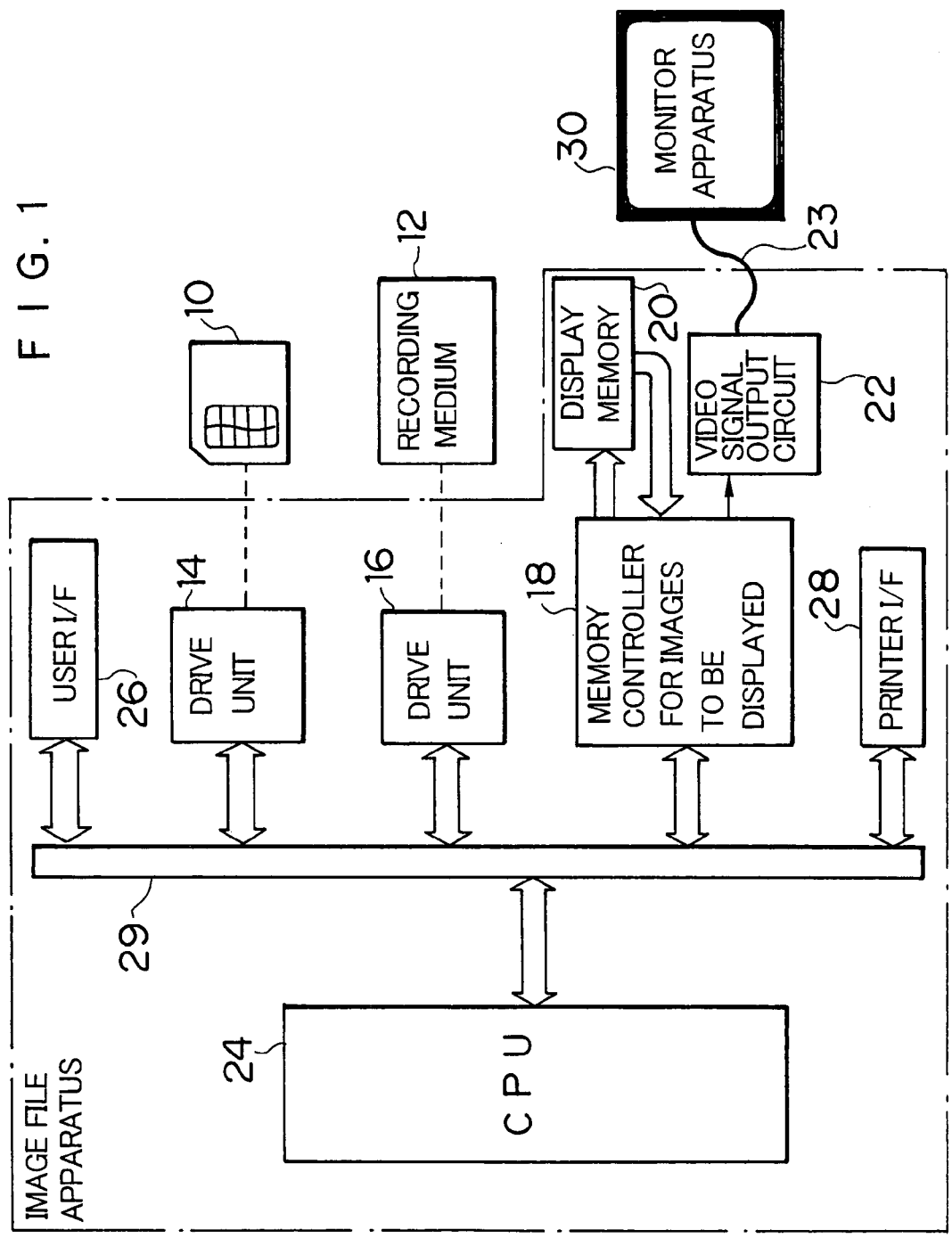
FIG. 1 is a block diagram showing an embodiment of an image file apparatus according to the present invention.

FIG. 1 is a block diagram showing an image file apparatus according to an embodiment of the present invention.

As shown in FIG. 1, the image file apparatus mainly has a function for recording image data, which is stored in a recording medium 10, in another recording medium 12, and a function for displaying an image on a monitor apparatus 30 such as a CRT in accordance with image data stored in the recording medium 12. The image file apparatus comprises: drive units 14, 16; a memory controller 18 for images to be displayed; a display memory 20; a video signal output circuit 22; and a central processing unit (CPU) 24.

The recording medium 10, such as a memory card or a smart medium, is used in a digital camera. The recording medium 12 (e.g., a magnetic disk, an optical disk, or a magneto-optical disk) has a larger recording capacity than the recording medium 10 used in the digital camera and is less expensive per bit than 20 the recording medium 10 used in the digital camera. The recording medium 12 may not always be detachably mounted in the image file apparatus, but it may also be built into the image file apparatus or attached to the outside of the image file apparatus.

The drive units 14, 16, the memory controller 18 and the CPU 24 are connected through a bus 29. The bus 29 connects to a user interface 26 for inputting a variety of commands from a user and a printer interface 28 for transferring image data and the like to a printer (not illustrated).

The CPU 24 unites and controls the circuits of the image file apparatus, and executes conversion, such as reduction and interpolation, for converting image data to decrease a large number of pixels therein to the number of pixels that a monitor apparatus 30 is configured to display (e.g., 640× 480 pixels). The CPU 24 also executes expansion/compression of the image data. Another processing means than the CPU 24 may execute the conversion and the expansion/ compression.

The drive unit 14 reads image data (original image data) recorded in the recording medium 10, and sends the original image data to the CPU 24 through the bus 29. The CPU 24 records the original image data in the recording medium 12 through the bus 29 and the drive unit 16. If the number of pixels in the original image data is larger than the number of pixels displayable on the monitor apparatus 30, the original image data is converted to reduce the number of pixels therein to the number of pixels corresponding to the monitor apparatus 30. The converted image data (image data for display) is outputted to the memory controller 18 through the bus 29.

The memory controller 18 writes the display image data in a display memory (a video RAM) 20, and repeatedly reads the display image data stored in the display memory 20. The memory controller 18 outputs the read display image data to the video signal output circuit 22. The video signal output circuit 22 comprises a D/A converter for converting the display image data to analog signals and an NTSC encoder. The video signal output circuit 22 generates NTSC video signals from the display image data, and outputs the NTSC video signals to the monitor apparatus 30 through a video signal cable 23. Consequently, an image is displayed on the monitor apparatus 30.

The display image data is recorded in the recording medium 12 through the drive unit 16. Thus, the original image data and the display image data corresponding to the original image data are recorded in the recording medium 12 and is stored in the display memory 20. If the recording medium 12 contains no display image data, the original image data is read and is stored in the display memory 20. In this case, the original image data has the same number of pixels as the display image data.

To display the image on the monitor apparatus 30 in accordance with the image data recorded in the recording medium 12, the display image data is read from the recording medium 12 and is stored in the display memory 20. If the recording medium 12 contains no display image data, the original image data is read and is stored in the display memory 20. In this case, the original image data has the same number of pixels as the display image data.

Then, the image is displayed on the monitor apparatus 30 in accordance with the image data stored in the display memory 20. More specifically, if the display image data is read from the recording medium 12 and the image is displayed according to the display image data, the recording medium 12 is accessed less frequently while the display image data is being read since the amount of the data is small. Moreover, the image can be displayed within a short time since there is no necessity of executing the conversion such as reduction of the image data.

Figure 2:
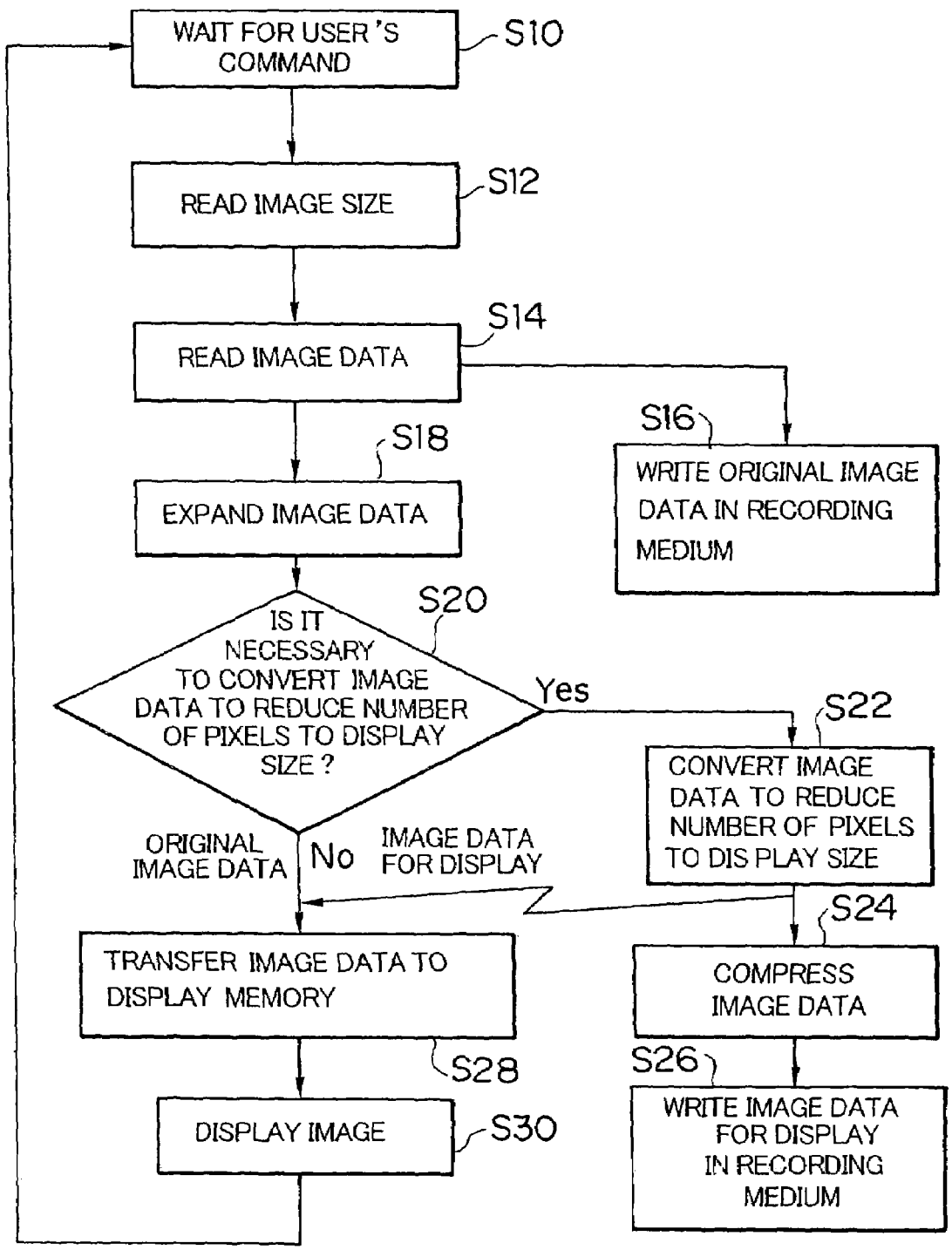
FIG. 2 is a flow chart that assists in explaining how an image is stored in the image file apparatus in FIG. 1.

Referring next to FIGS. 2 and 3, the operation of the image file apparatus that is constructed in the above-mentioned manner will be explained.

The user inputs a command for storing an image through the user interface 26 by operating a switch, a remote controller, or the like (not illustrated). This occurs while the image file apparatus is waiting for the user's command at step S10 in FIG. 2. A size (the number of pixels in vertical and horizontal directions) of the image to be recorded is read from the recording medium 10 (step S12), and the image data (the original image data) is read (step S14). The image size is recorded in a header of an image file.

The original image data is recorded in the recording medium 12 (step S16). The original image data, which has been compressed in a predetermined format to be recorded, is expanded (step S18).

Then, it is determined whether or not it is necessary to convert the original image data to reduce the number of the pixels therein to fit within a display size, according to the image size of the original image data read at the step S12 (step S20). If it is determined that it is necessary to convert the original image data (if the number of pixels in the original image data is larger than the number of the pixels of the monitor apparatus 30), the original image data is converted (e.g., reduced) to reduce the number of the pixels therein to the number of pixels corresponding to the monitor apparatus 30 (step S22).

The converted image data (display image data) is compressed in a predetermined format (step S24), and recorded in the recording medium 12 (step S26). The display image data converted at step S22 is transferred into the display memory 20 (step S28).

If it is determined that it is not necessary to convert the original image data, the original image data is transferred into the display memory 20 (step S28).

The monitor apparatus 30 displays an image according to the image data (original or display image data) transferred into the display memory 20 (step S30), and the state returns to the user's command waiting state (step S10).

Next, an explanation will be given for regenerating the image according to either the original image data or display image data recorded in the recording medium 12.

When the user inputs a command for regenerating an image through the user interface 26 as shown in FIG. 3 (step S50), an image to be regenerated is selected (step S52). The image is selected based on an index image, by inputting a frame number, by displaying the next frame or the last frame, or the like.

After the image is selected, it is determined whether there is display image data relating to the selected image in the recording medium 12 (step S54).

Now, an explanation will be provided for the method of determining whether there is display image data relating to the selected image or not.

When the image data is stored in the recording medium 12, a management table file (as shown in the following TABLE 1) is produced and recorded in the recording medium 12.

TABLE 1

| Management table file | (A, A'), B, (C, C'), . . . |
| --- | --- |

In the above management table file, (A, A') and (C, C') indicate that there is both original image data and the display image data corresponding to particular images. B indicates that there is only the original image data for another image.

If the management table file indicates that display image data exists for the image to be regenerated, the image data for display is read from the recording medium 12 (step S56). If it is determined 10 that there is no display image data, the original image data is read from the recording medium 12 (step S58). The original image data has the same size as that of display image data.

Whichever of the original image data or display image data is read in the above-mentioned manner is expanded from its compressed state (step S60) and transferred to the display memory 20 (step S62). The monitor apparatus 30 displays the image according to the image data (original or display image data) transferred to the display memory 20 (step S64).

As stated above, the image is displayed according to display image data or original image data in the recording medium 12, whose data amount is small. This decreases the frequency at which the recording medium 12 is accessed in order to read the image data, and eliminates the necessity of executing the conversion (e.g., reduction) of the image data. Therefore, the image can be displayed within a short time.

As shown in FIG. 1, the image file apparatus has the printer interface 28, through which the original image data is transferred from the recording medium 12 to the printer.

In this embodiment, the original image data is read from the recording medium 10 and is stored in the recording medium 12. However, the present invention is not restricted to this embodiment. For example, the original image data may be captured through digital communication. Also, the monitor apparatus 30 is not necessarily connected to the image file apparatus with the video signal cable 23—it may be built into the image file apparatus, instead. Furthermore, the number of pixels in the display image data should not be restricted to any particular amount, according to an exemplary embodiment. Moreover, if the number of pixels in the original image data is smaller than the number of pixels in the image data for display, the number of pixels in the original image data is increased to the number of pixels corresponding to the display image data by means of interpolation or the like.

As set forth hereinabove, the inputted original image is stored in the recording medium 12, and if the size of the original image data is different from the display size corresponding to the image display means, the original image data is changed into display image data whose size is that of the display size of the image display means. In this case, the original image and display image data are stored at the same time. Therefore, in order to display the image, the small amount of display image data is accessed instead of the large amount of original image data. This reduces the access time and eliminates the necessity of reducing and interpolating the image. Consequently, a desired image can be displayed on the image display means within a short time.

The display image data is stored with the original image data, and the display image data is accessed to display the image. Thus, the original image data can be backed up.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image file apparatus, comprising:
   an image data reading device that reads original image data in a compressed format from an interchangeable recording medium;
   a converting device that compares a size of the original image data to a display size corresponding to a display, the converting device being adapted to convert the original image data when necessary according to the following:
      when the size of the original image data exceeds the display size, the converting device decreases the size of the original image data read by the image data reading device substantially down to the display size of the display, and
      when the size of the original image data is smaller than the display size, the converting device increases the size of the original image data read by the image data reading device substantially up to the display size of the display,
      wherein the original image data is in an expanded format when the necessary conversion is performed; and
   an image recording device that records the original image data read by the image data reading device onto a first recording medium in a compressed format, and that records the display image data produced by the converting device onto the first recording medium in a compressed format if the original image data has been converted by the converting device,
   wherein the display includes a display memory, and at least one of the original and display image data is transferred from the first recording medium to the display memory before being displayed.

2. The image file apparatus as defined in claim 1, wherein the interchangeable recording medium is a second recording medium that is built into a digital camera.

3. The image file apparatus as defined in claim 1, wherein the interchangeable recording medium is a second recording medium capable of being detachably mounted in a digital camera.

4. The image file apparatus as defined in claim 1, wherein the first recording medium is built into the image file apparatus.

5. The image file apparatus as defined in claim 1, wherein the first recording medium is an external recording medium operably connected to the image file apparatus.

6. The image file apparatus as defined in claim 1, wherein the first recording medium is detachably mounted in the image file apparatus.

7. The image file apparatus as defined in claim 1, further comprising:
   an image data reading device operably connected to the first recording medium that is configured to:
   if the conversion of the original image data has been determined to be necessary by the converting device, read the display image data from the first recording medium, and
   if the conversion of the original image data has not been determined to be necessary, read the original image data from the first recording medium; and
   a display driver that drives the display to display an image in accordance with one of the original image data and the display image data, the one of the original image data and the display image data being read from the first recording medium.

8. The image file apparatus as defined in claim 1, wherein if the size of the original image data is larger than the display size corresponding to the display, the converting device is configured to:
   determine that conversion is necessary, and convert the original image data in order to reduce the number of pixels.

9. The image file apparatus as defined in claim 1, wherein if the size of the original image data is smaller than the display size corresponding to the display, the converting device is configured to:
   determine that conversion is necessary, and
   convert the original image data in order to increase the number of pixels by interpolation.

10. The image file apparatus as defined in claim 1, wherein the original image data is captured via digital communication, the captured original image data being read by the image data reading device.

11. An image filing method, comprising:
   reading original image data in a compressed format from an interchangeable recording medium;
   comparing a size of the original image data and a display size corresponding to a display device;
   converting the original image data into display image data when necessary according to the following:
      when the size of the original image data exceeds the display size, decreasing the size of the original image data substantially down to the display size, and
      when the size of the original image data is smaller than the display size, increasing the size of the original image data substantially up to the display size;
   recording the original image data onto a first medium in a compressed format; and
   if the original image data is converted into the display image data, recording the display image data in the first recording medium in a compressed format,
   wherein the display includes a display memory, and at least one of the original and display image data is transferred from the first recording medium to the display memory before being displayed, and
   wherein, if the original image data is converted into the display image data, the original image data is in an expanded format when the conversion is performed.

12. The method as defined in claim 11, wherein the interchangeable recording medium is a second recording medium built into a digital camera.

13. The method as defined in claim 11, wherein the interchangeable recording medium is a second recording medium capable of being mounted in a digital camera.

14. The method as defined in claim 11, further comprising:
   reading display driving data from the first recording medium; and
   driving the display apparatus to display an image based on the display driving data,
   wherein the display driving data is read from the first recording medium by:
      if the image data has been converted from the original image data and recorded in the first recording medium, reading the display image data as the display driving data; and
      if the display image data has not been converted from the original image data and recorded in the first recording medium, reading the original image data as the display driving data.

15. The method as defined in claim 14, further comprising:
   determining, from a management table file stored in the first recording medium, whether the image data has been converted from the original image data and recorded in the first recording.

16. The method as defined in claim 11, wherein
   the determining step determines that conversion is necessary if the size of the original image data is larger than the display size corresponding to the display apparatus, thereby causing the converting step to convert the original image data by reducing a number of pixels therein.

17. The method as defined in claim 11, wherein
   the determining step determines that conversion is necessary if the size of the original image data is smaller than the display size corresponding to the display apparatus, thereby causing the converting step to convert the original image data by increasing a number of pixels therein by interpolation.

18. The method as defined in claim 11, wherein the determining step determines the conversion is not necessary if the size of the original image data is compatible with the display size corresponding to the display apparatus.

19. The method as defined in claim 11, further comprising:
   capturing the original image data via digital communication, wherein the reading step reads the captured original image data.

20. An image file apparatus, comprising:
   an image data reading device that reads original image data;
   a converting device that determines whether conversion of the original image data is necessary based on a size of the original image data and a display size corresponding to a display, and if conversion is determined to be necessary, converts the original image data read by the image data reading device into display image data in the display size of the display;
   an image recording device that records the original image data read by the image data reading device onto a first recording medium, and that records the display image data produced by the converting device onto the first recording medium if the conversion of the original image data has been determined to be necessary by the converting device;
   a management table file stored in the first recording medium;
   an image data reading device operably connected to the first recording medium that determines one of the original image data and the display image data that is to be read from the first recording medium according to information in the management table file.

* * * * *